United States Patent
Nomura et al.

(10) Patent No.: US 6,369,956 B1
(45) Date of Patent: Apr. 9, 2002

(54) ZOOM LENS BARREL

(75) Inventors: Hiroshi Nomura, Saitama; Nobuaki Aoki, Tokyo; Takamitsu Sasaki, Saitama; Kazunori Ishizuka, Kanagawa, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/694,348

(22) Filed: Oct. 24, 2000

(30) Foreign Application Priority Data

Oct. 27, 1999 (JP) .............................. 11-305222

(51) Int. Cl.[7] .............................. G02B 15/14; G02B 7/02
(52) U.S. Cl. ...................................... 359/700; 359/823
(58) Field of Search .............................. 359/694, 700, 359/819, 823, 704

(56) References Cited

U.S. PATENT DOCUMENTS

| 5,287,137 A | * | 2/1994 | Hara et al. .................... 396/87 |
| 5,446,593 A | | 8/1995 | Hamasaki et al. .......... 359/704 |
| 5,488,513 A | | 1/1996 | Tanaka ........................ 359/699 |
| 5,589,987 A | | 12/1996 | Tanaka ........................ 359/701 |
| 5,708,533 A | | 1/1998 | Hamasaki ................... 359/700 |
| 5,861,998 A | * | 1/1999 | Nishimura .................. 359/694 |
| 5,912,772 A | | 6/1999 | Aoki .......................... 359/701 |
| 6,147,814 A | * | 11/2000 | Kitazawa et al. ........... 359/699 |

* cited by examiner

Primary Examiner—Ricky Mack
(74) Attorney, Agent, or Firm—Greenblum & Bernstein, P.L.C.

(57) ABSTRACT

A zoom lens barrel includes a rotary feed cylinder which is moved in an optical axis direction while being rotated; a linear movement cylinder which is provided within the rotary feed cylinder; and a connecting structure for connecting the linear movement cylinder to the rotary feed cylinder. The connecting structure includes at least two circumferential grooves centered about the optical axis, provided on the inner peripheral surface of the rotary feed cylinder or the outer peripheral surface of the linear movement cylinder, at different positions in the optical axis direction; and at least two radially extending engagement pawls which correspond to the at least two circumferential grooves, the engagement pawls being engaged in the circumferential grooves so as to slide in the circumferential direction and so as not to relatively move in the optical axis direction.

13 Claims, 5 Drawing Sheets

ZOOM LENS BARREL

BACKGROUND OF THE INVENTION

1. Field of the Invention

The present invention relates to a zoom lens barrel.

2. Description of the Related Art

In general, a zoom lens barrel of a zoom compact camera, etc., includes a rotary cylinder (rotary feed cylinder) which is rotatable relative to a camera body, and a linear movement cylinder which is provided in the rotary cylinder so as not to rotate, wherein the rotary cylinder and the linear movement cylinder are relatively rotatable and are movable together in the optical axis direction. Generally speaking, the rotary cylinder and the linear movement cylinder are provided, on their rear ends in the optical axis direction, with a pawl or flange and a circumferential groove, so that the rotary cylinder and the linear movement cylinder are guided so as to relatively rotate through the engagement of the pawl or flange and the circumferential groove. Consequently, a sufficient strength of the cylinders at the rear ends thereof can be easily obtained, but it is difficult to obtain a sufficient strength at the front ends thereof. For instance, if the linear movement cylinder is provided with a through-groove which is adapted to rotate another rotary feed cylinder provided within the linear movement cylinder, the strength of the linear movement cylinder is reduced due to the presence of the through-groove. Consequently, the linear movement cylinder tends to be deflected or inclined toward the optical axis, particularly at the front end thereof. The deflection or inclination of the linear movement cylinder causes an error in the photographing optical system. To solve these problems, in conventional zoom lens barrels, the thickness of the barrel is increased, the length of the portion of the linear movement cylinder on which no through-groove is formed is increased, or reinforcing rings are provided at the front ends of the rotary cylinder and the linear movement cylinder. However, these solutions result in an increase in the size or in the number of the elements of the lens barrel.

SUMMARY OF THE INVENTION

It is an object of the present invention to provide a small and simple zoom lens barrel having an increased strength.

In order to achieve the above-mentioned object, a zoom lens barrel is provided, including a rotary feed cylinder which is moved in an optical axis direction while being rotated; a linear movement cylinder which is provided within the rotary feed cylinder and which is guided to linearly move in the optical axis direction; and a connecting structure for connecting the linear movement cylinder to the rotary feed cylinder so as to relatively rotate and so as not to relatively move in the optical axis direction. The connecting structure includes at least two circumferential grooves centered about the optical axis, which are provided on one of the inner peripheral surface of the rotary feed cylinder or the outer peripheral surface of the linear movement cylinder, at different positions in the optical axis direction; and at least two radially extending engagement pawls which are provided on the other of the inner peripheral surface of the rotary feed cylinder or the outer peripheral surface of the linear movement cylinder, at different positions in the optical axis direction and which correspond to the at least two circumferential grooves, the engagement pawls being engaged in the circumferential grooves so as to slide in the circumferential direction and so as not to relatively move in the optical axis direction.

With this arrangement, since the connecting portion between the rotary feed cylinder and the linear movement cylinder is made of a plurality of circumferential grooves and engagement pawls, formed at different axial positions, the degree of connection is enhanced. Thus, a sufficient strength of the lens barrel over the entire axial length can be provided without increasing the thickness or the axial length of the barrel or providing reinforcing rings.

To provide sufficient strength, it is preferable that the at least two circumferential grooves are located on opposite sides of either the inner peripheral surface of the rotary feed cylinder or the outer peripheral surface of the linear movement cylinder, in the optical axis direction, in which the circumferential grooves are formed.

In an embodiment, the at least two engagement pawls are provided on the linear movement cylinder, the linear movement cylinder being provided with a through-groove inclined with respect to the optical axis, the at least two engagement pawls being located on opposite sides of the through-groove in the optical axis direction.

Preferably, the connecting structure includes a plurality of coaxial engagement pawls at different circumferential positions, corresponding to the at least two circumferential grooves.

To facilitate assembly and disassembly, it is preferable that the at least two circumferential grooves are formed on the inner peripheral surface of the rotary feed cylinder, the at least two engagement pawls being formed on the outer peripheral surface of the linear movement cylinder, the rotary feed cylinder being provided on the inner peripheral surface thereof with a pawl engagement/disengagement groove which extends from the rear end thereof to the frontmost circumferential groove, of the at least two circumferential grooves, in parallel with the optical axis, so that the engagement pawls can be disengageably engaged with the at least two circumferential grooves in the optical axis direction at a specific relative angular position between the rotary feed cylinder and the linear movement cylinder.

In an embodiment, the inner peripheral surface of the rotary feed cylinder, on which the circumferential grooves are formed, is provided with an axial groove different from the pawl engagement/disengagement groove, the axial groove extending in parallel with the optical axis and intersecting the circumferential grooves, wherein the length of the engagement pawls in the circumferential direction are larger than the width of the axial groove. Consequently, no disengagement of the engagement pawls occurs at a portion other than the pawl engagement/disengagement groove.

According to another aspect of the present invention, a zoom lens barrel is provided, having a pair of cylindrical members of different diameters which are connected so as to relatively rotate and so as not to relatively move in an optical axis direction, wherein a connecting structure for connecting the pair of cylindrical members includes at least two circumferential grooves centered about the optical axis, which are provided on one of an inner peripheral surface of a larger diameter cylindrical member of the pair of cylindrical members, and an outer peripheral surface of a smaller diameter cylindrical member of the pair of cylindrical members, at different positions in the optical axis direction; and at least two radially extending engagement pawls which are provided on the other of the inner peripheral surface of the larger diameter cylindrical member and the outer peripheral surface of the smaller diameter cylindrical member, at different positions in the optical axis direction, and which correspond to the at least two circumferential grooves, the engagement pawls being engaged in the circumferential grooves so as to slide in the circumferential direction and so as not to relatively move in the optical axis direction.

According to another aspect of the present invention, a connecting structure of a pair of cylindrical members used for a zoom lens barrel is provided, the pair of cylindrical members having different diameters, the connecting structure including at least two circumferential grooves centered about the optical axis, which are provided on one of an inner peripheral surface of a larger diameter cylindrical member of the pair of cylindrical members, and an outer peripheral surface of a smaller diameter cylindrical member of the pair of cylindrical members, at different positions in the optical axis direction; and at least two radially extending engagement pawls which are provided on the other of the inner peripheral surface of the larger diameter cylindrical member and the outer peripheral surface of the smaller diameter cylindrical member, at different positions in the optical axis direction and which correspond to the at least two circumferential grooves, the engagement pawls being engaged in the circumferential grooves so as to slide in the circumferential direction and so as not to relatively move in the optical axis direction.

To provide sufficient strength, it is preferable that the at least two circumferential grooves are located on opposite sides of one of the larger diameter cylindrical member and the smaller diameter cylindrical member, in the optical axis direction, in which the circumferential grooves are formed.

In an embodiment, the at least two engagement pawls are provided on the smaller diameter cylindrical member, the smaller diameter cylindrical member being provided with a through-groove inclined with respect to the optical axis, the at least two engagement pawls being located on opposite sides of the through-groove in the optical axis direction.

Preferably, the connecting structure includes a plurality of coaxial engagement pawls at different circumferential positions, corresponding to the at least two circumferential grooves.

To facilitate assembly, it is preferably that the at least two circumferential grooves are formed on the inner peripheral surface of the larger diameter cylindrical member, the at least two engagement pawls being formed on the outer peripheral surface of the smaller diameter cylindrical member, the larger diameter cylindrical member being provided on the inner peripheral surface thereof with a pawl engagement/disengagement groove which extends from the rear end thereof to the frontmost circumferential groove, of the at least two circumferential groove, in parallel with the optical axis, so that the engagement pawls can be disengageably engaged with the at least two circumferential grooves in the optical axis direction at a specific relative angular position between the larger diameter cylindrical member and the smaller diameter cylindrical member.

In an embodiment, the inner peripheral surface of the larger diameter cylindrical member on which the circumferential grooves are formed, is provided with an axial groove different from the pawl engagement/disengagement groove, the axial groove extending in parallel with the optical axis and intersecting the circumferential grooves, the length of the engagement pawls in the circumferential direction being larger than the width of the axial groove. The present disclosure relates to subject matter contained in Japanese Patent Application No.11-305222 (filed on Oct. 27, 1999) which is expressly incorporated herein by reference in its entirety.

BRIEF DESCRIPTION OF THE DRAWINGS

The invention will be discussed below in detail with reference to the drawings, in which.

DESCRIPTION OF THE PREFERRED EMBODIMENT

A zoom lens barrel 10 is provided on a camera body of a zoom compact camera (not shown). The zooming operation is carried out by varying a distance between a first lens group L1 and a second lens group L2 and a distance of the lens groups from a film surface. The focusing operation is carried out by moving the first lens group L1 in the direction of the optical axis O. Looking at FIGS. 1 and 2, the structure and operation of the zoom lens barrel 10 will be generally discussed below. Note that in the following discussion, the optical axis direction refers to a direction parallel to the photographing optical axis, and the circumferential direction refers to a circumferential direction about the photographing optical axis.

Figure 1:
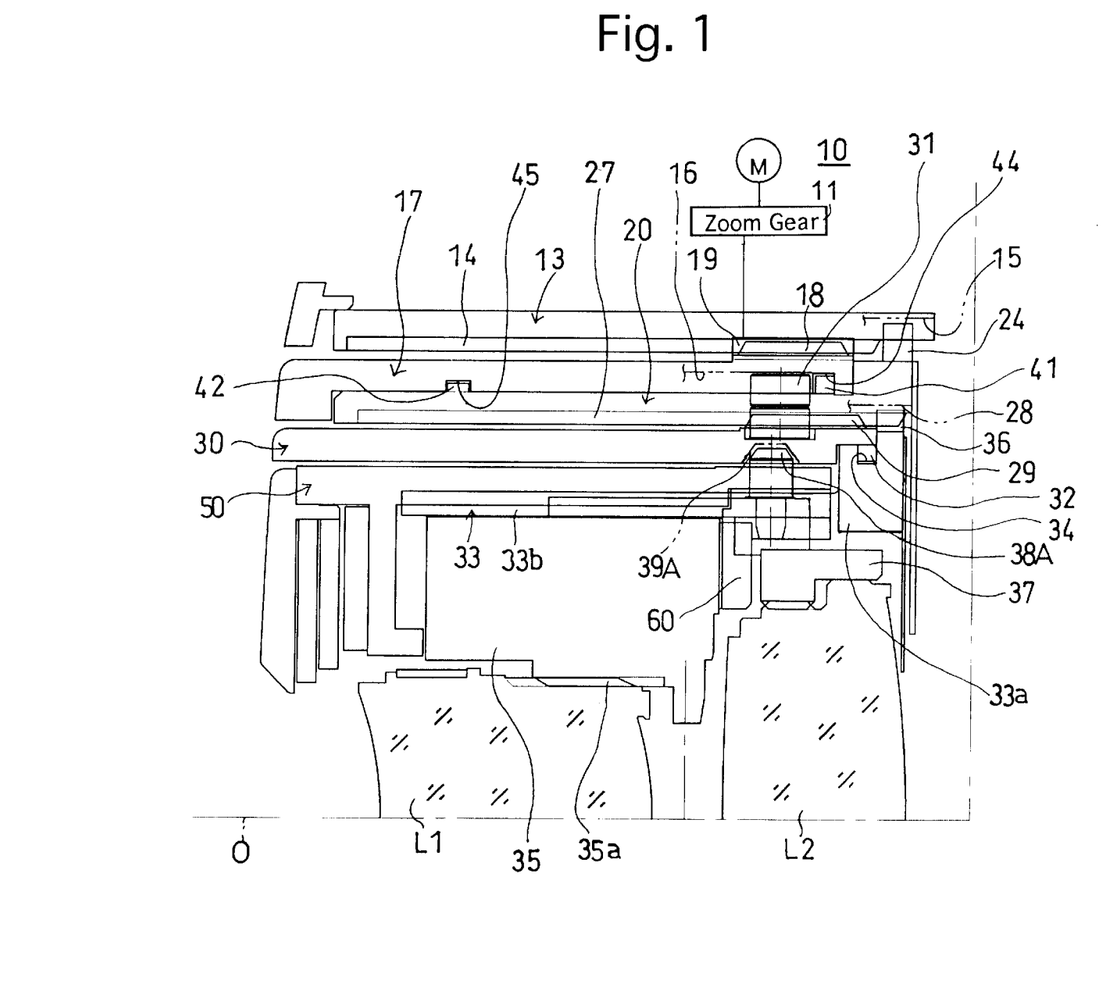
FIG. 1 is a longitudinal sectional view of a zoom lens barrel in a retracted position, according to an embodiment of the present invention.
Figure 2:
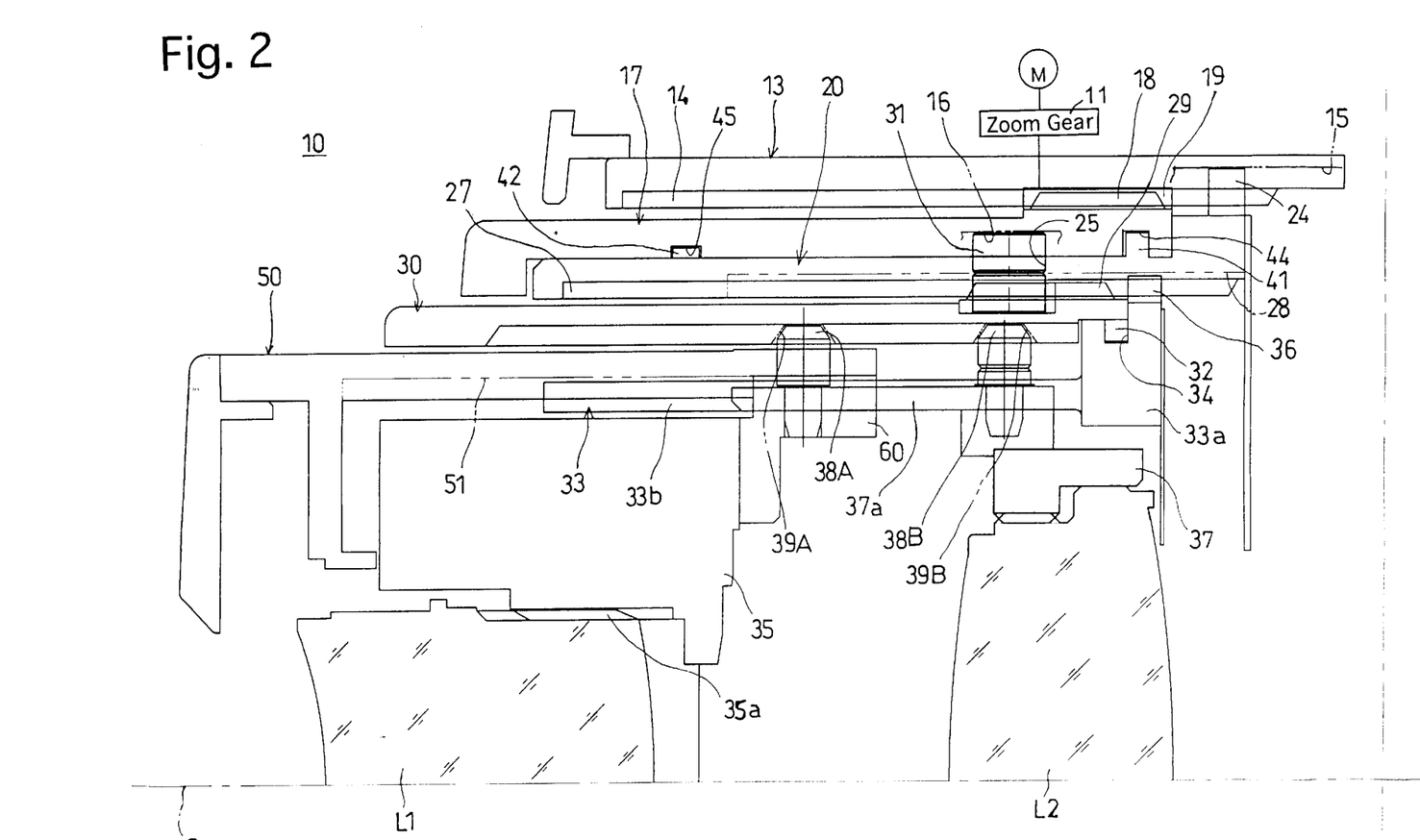
FIG. 2 is a longitudinal sectional view of a zoom lens barrel which is extended to a wide-angle extremity, according to an embodiment of the present invention.

A stationary barrel 13 is secured to a camera body (not shown). The stationary barrel 13 is provided on its inner surface with a female helicoid 14 and linear movement guide grooves 15 extending in parallel with the optical axis O. A plurality of linear movement guide grooves 15 are provided at circumferentially different positions on their stationary barrel 13; only one of them is shown in FIGS. 1 and 2. Note that the stationary barrel 13 is provided with a cut-away portion (not shown) elongated in a direction parallel with the optical axis O, so that a tooth surface of a zoom gear 11 is exposed inwardly through the cut-away portion. The zoom gear 11 is rotated about an axis parallel with the optical axis O by a zoom motor M.

Figure 5:
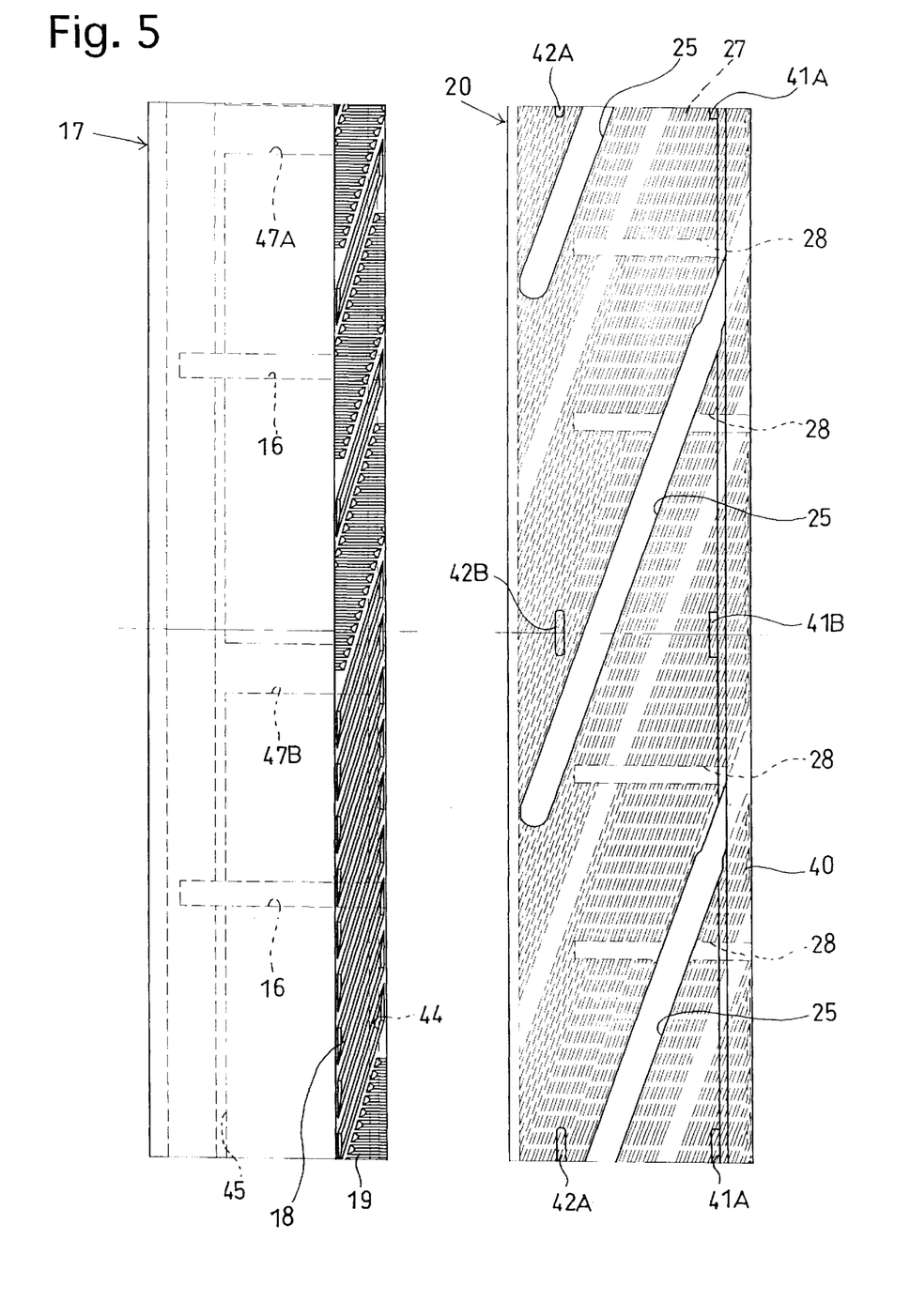

The female helicoid 14 of the stationary barrel 13 is in mesh with a male helicoid 18 formed on the outer surface of a first rotary cylinder (rotary feed cylinder/larger diameter cylindrical member) 17 at the rear end thereof. The thread of the male helicoid 18 of the first rotary cylinder 17 is partly widened so that an outer peripheral gear 19, which is engaged with the zoom gear 11, is provided on the wide thread. As can be seen in FIG. 5, the teeth of the outer peripheral gear 19 are parallel with the optical axis O. The first rotary cylinder 17 is provided on its inner surface with a pair of linear cam grooves (axial grooves) 16 which are arranged substantially symmetrically with respect to the optical axis O. The linear cam grooves 16 extend in parallel with the optical axis and have bottoms. The linear cam grooves 16 open at the rear ends thereof into the rear end face of the first rotary cylinder 17.

Figure 4:
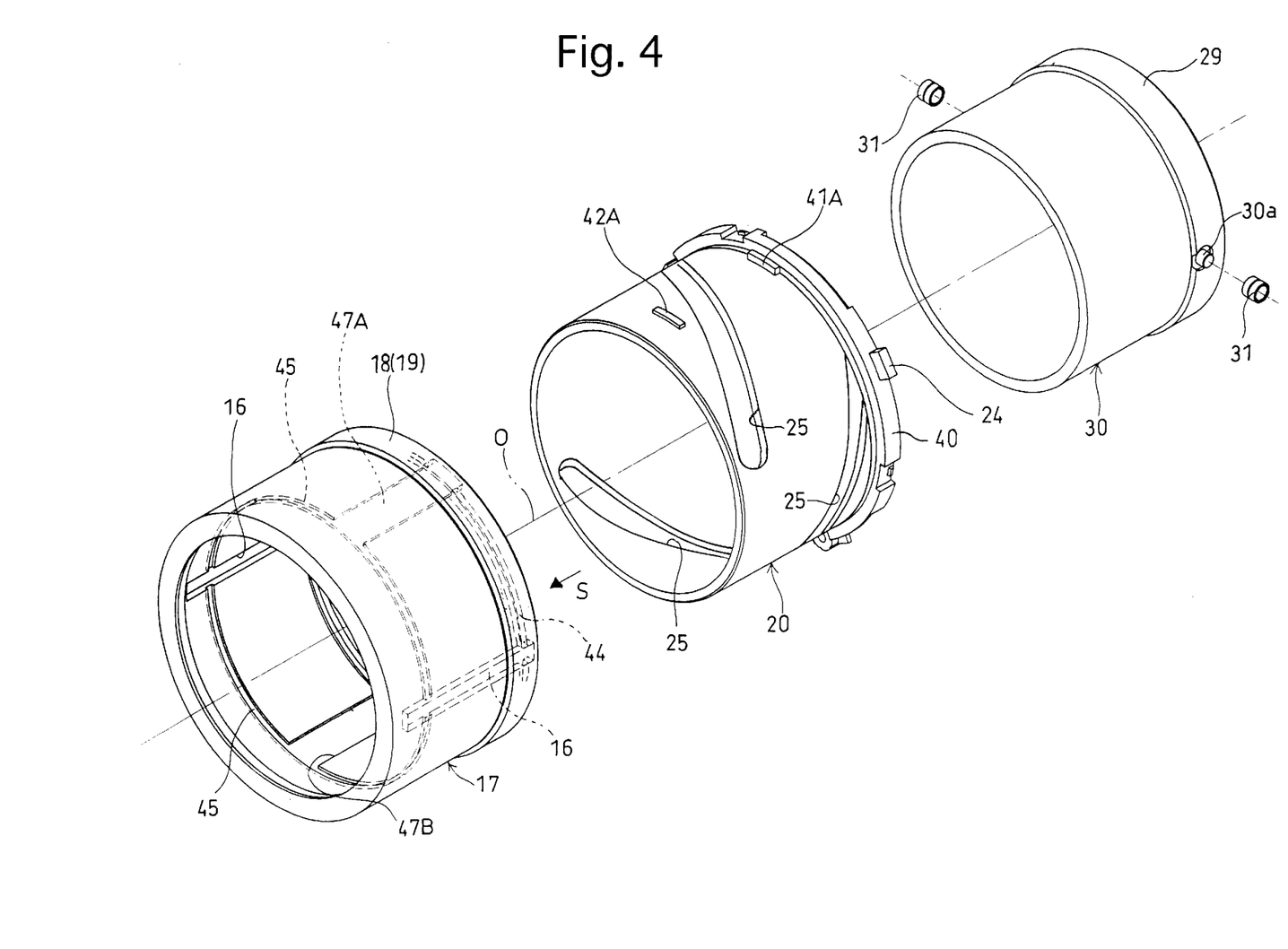
FIG. 4 is an exploded perspective view of a first rotary cylinder, a first linear movement cylinder, and a second rotary cylinder, of a zoom lens barrel shown in FIGS. 1 and 2; and, FIG. 5 is a developed view of a first rotary cylinder and a first linear movement cylinder.

A first linear movement cylinder (linear movement cylinder/smaller diameter cylindrical member) 20 is provided in the first rotary cylinder 17. The first linear movement cylinder 20 is connected to the first rotary cylinder 17 so as to relatively rotate about the optical axis O and so as not to relatively move in the optical axis direction. The first linear movement cylinder 20 is provided, on its rear end of the outer peripheral surface, with radially and outwardly extending linear movement guide projections 24 (only one of which is shown in FIGS. 1, 2 and 4) that are spaced from one another in the circumferential direction at a predetermined distance. The linear movement guide projections 24 are slidably engaged in the linear movement guide groove 15 formed on the inner surface of the stationary barrel 13. Consequently, the first linear movement cylinder 20 is movable together with the first rotary cylinder 17 in the optical axis direction and is not rotatable relative to the stationary barrel 13 in the circumferential direction about the optical axis O. Namely, the first linear movement cylinder 20 is guided so as to linearly move along the optical axis O.

The first rotary cylinder 17 and the first linear movement cylinder 20 constitute a first feed stage of the zoom lens barrel 10. In the first feed stage, when the zoom gear 11 is rotated by the zoom motor M in a predetermined barrel feed direction, the first rotary cylinder 17 is rotated through the outer peripheral gears 19, so that the first rotary cylinder 17 is moved (extended) forward from the stationary barrel 13 while being rotated, through the engagement of the female helicoid 14 and the male helicoid 18. At the same time, the first linear movement cylinder 20 which is supported to rotate relative to the first rotary cylinder 17 is moved in the optical axis directions together with the first rotary cylinder 17 while being guided to linearly move relative to the stationary barrel 13. Note that the zoom gear 11 is made of multiple pinions elongated in the optical axis direction, so that the outer peripheral gears 19 are not disengaged from the zoom gear 11 when the first rotary cylinder 17 is advanced forward (outward).

The first linear movement cylinder 20 is provided on its inner surface with a female helicoid 27 whose direction is the same as that of the female helicoid 14. The first linear movement cylinder 20 is also provided on its inner surface with linear movement guide grooves 28 which extend in parallel with respect to the optical axis O and which are spaced from one another at a predetermined distance in the circumferential direction. Only one of the linear movement guide grooves 28 is shown in FIGS. 1 and 2.

Also, the first linear movement cylinder 20 is provided with two through-grooves 25 that extend through the thickness of the cylinder from the outer peripheral surface to the inner peripheral surface. As shown in FIG. 5, the two through-grooves 25 are parallel to be substantially parallel with the threads of the female helicoid 27 and are inclined with respect to the optical axis O.

Figure 3:
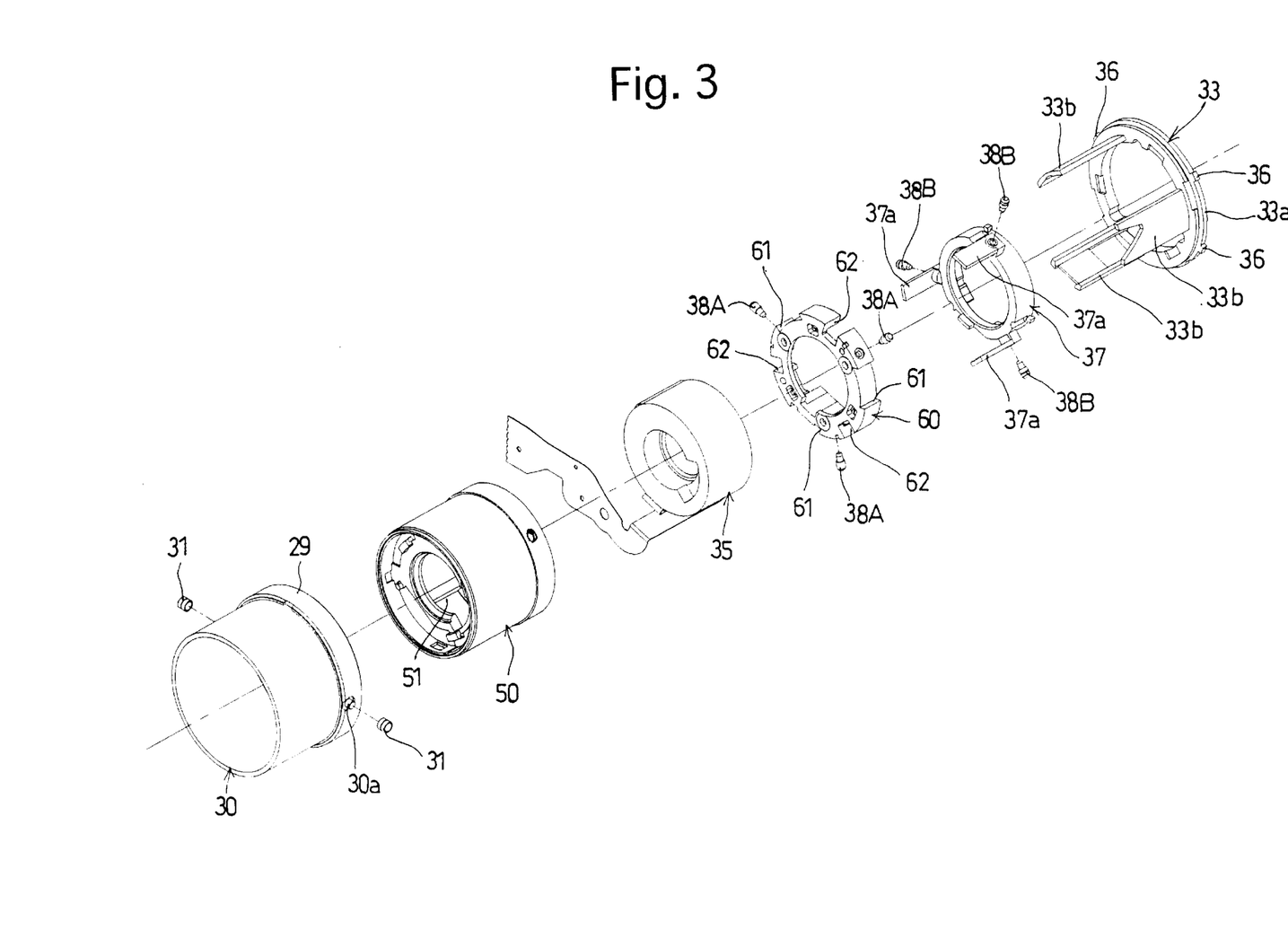
FIG. 3 is an exploded perspective view of elements located inside a second rotary cylinder of a zoom lens barrel shown in FIGS. 1 and 2.

A second rotary cylinder 30 which is provided on its outer peripheral surface with a male helicoid 29 which is in mesh with the female helicoid 27 is provided within the first linear movement cylinder 20. The male helicoid 29 is provided on the outer peripheral surface of the rear end of the second rotary cylinder 30. As shown in FIG. 4, the second rotary cylinder 30 is provided on the outer peripheral surface of the rear end thereof with a pair of support pins 30a (only one of which is shown in FIGS. 3 and 4) that extend through cut-away portions of the male helicoid 29. A pair of cam projections 31 are mounted to the support pins 30a. The cam projections 31 extend through the through-grooves 25 formed in the first linear movement cylinder 20 and are engaged, at the front ends, in axially extending linear cam grooves 16 formed on the inner surface of the first rotary cylinder 17. Consequently, when the first rotary cylinder 17 is rotated by the zoom motor M, the rotational force is transmitted to the second rotary cylinder 30 through the cam projections 31 that engage with the linear cam grooves 16.

As a result, the second rotary cylinder 30 is moved forward (fed) from the first linear movement cylinder 20 while being rotated in the same direction as the first rotary cylinder 17, through the engagement between the male helicoid 29 and the female helicoid 27. Since the cam projections 31 extend through the through-grooves 25 parallel with the female helicoid 27, the cam projections 31 are moved in the through-grooves 25 in accordance with the feed operation. Conversely, when the first rotary cylinder 17 is rotated in the retracted position, the second rotary cylinder 30 is moved into the first linear movement cylinder 20 while rotating in the same direction as the first rotary cylinder 17.

A second linear movement cylinder 33 is provided within the second rotary cylinder 30. The second linear movement cylinder 33 includes a flange portion 33a on the rear end side, and three linear movement guide portions 33b in front of the flange portion 33a in the optical axis direction. An annular groove 34 whose center is located on the optical axis O is formed on the outer peripheral surface of the flange portion 33a. The second rotary cylinder 30 is provided on its inner surface with engagement pawls 32 that are fitted in the annular groove 34, so as not to relatively move in the optical axis direction O but so as to relatively rotate. The engagement pawls can be disengaged only at a specific angular position.

The second linear movement cylinder 33 is provided on the outer surface of the rear end thereof with a plurality of radially extending linear movement guide projections 36 at different circumferential positions. The linear movement guide projections 36 are slidably engaged in the linear movement guide grooves 28 formed on the inner peripheral surface of the first linear movement cylinder 20. Consequently, the second linear movement cylinder 33 is linearly guided by the first linear movement cylinder 20.

The second rotary cylinder 30 and the second linear movement cylinder 33 constitute a second feed stage of the zoom lens barrel 10. As mentioned above, when the first rotary cylinder 17 which constitutes the first feed stage is rotated to move the same forward from the first rotary cylinder 17, the second rotary cylinder 30 is advanced from the first linear movement cylinder 20 while rotating in the same direction as the first rotary cylinder 17 with respect to the stationary barrel 13. At the same time, the second linear movement cylinder 33, which is connected to the second rotary cylinder 30 so as only to relatively rotate, is linearly guided by the first linear movement cylinder 20 and is moved along the optical axis O together with the second rotary cylinder 30 in accordance with the relationship between the linear movement guide projections 36 and the linear movement guide grooves 28.

A third linear movement cylinder 50 is provided between the second rotary cylinder 30 and the second linear movement cylinder 33. The third linear movement cylinder 50 is provided with an entirely circular cylindrical surface which defines an outer appearance of the lens barrel 10, unlike the second linear movement cylinder 33 which is a partially circular cylinder. The third linear movement cylinder 50 is provided therein with a shutter block 35 secured thereto through a linear movement guide ring 60. The first lens group L1 is supported by the shutter block 35 through a focusing helicoid 35a, so that when a focusing motor (not shown) incorporated in the shutter block 35 is driven, the first lens group L1 is moved in the direction of the optical axis O while rotating, in accordance with the focusing helicoid 35a, to carry out the focusing operation.

The linear movement guide ring 60 is secured to the rear end of the shutter block 35. The linear movement guide ring 60 is provided with three first linear movement guide groves 61 and three second linear movement guide grooves 62, which are arranged alternately in the circumferential direction. The first and second linear movement guide grooves 61 and 62 extend in the optical axis direction. Three linear movement guide portions 33b provided on the second linear movement cylinder 33 are fitted in the first linear movement guide grooves 61. Due to the engagement of the linear movement guide portions 33b in the corresponding first linear movement guide grooves 61, the third linear movement cylinder 50 (shutter block 35) and the linear movement guide ring 60 are guided to linearly move in the optical axis direction. The third linear movement cylinder 50 is provided on its inner surface with three axially extending interference prevention grooves 51 (only one of which is shown in FIGS. 2 and 3) at circumferential positions corresponding to the first linear movement guide grooves 61. The interference prevention grooves 51 are adapted to prevent the linear movement guide portions 33b guided by the linear movement guide ring 60 from interfering with the third linear movement cylinder 50.

Three first rollers 38A are provided on the outer surface of the rear end of the third linear movement cylinder 50 at different circumferential positions. The third linear movement cylinder 50 and the linear movement guide ring 60 are partly overlapped at the rear ends thereof. The inner ends of the first rollers 38A in the radial direction extend in the third linear movement cylinder 50 and are inserted in the linear movement guide ring 60 at the overlapped portion to connect the third linear movement cylinder 50 and the linear movement guide ring 60 so as not to move relative to each other in the optical axis direction or in the circumferential direction. The outer ends of the first rollers 38A in the radial direction are slidably fitted in first lens group guide grooves 39A formed on the inner peripheral surface of the second rotary cylinder 30. The first lens group guide grooves 39A are inclined at a predetermined angle with respect to the optical axis O, so that when the second rotary cylinder 30 is rotated, the first rollers 38A are guided by the first lens group guide grooves 39A. Consequently, the third linear movement cylinder 50 which is guided to move linearly through the second linear movement cylinder 33 is moved forward or backward in the optical axis direction with respect to the second feed stage. Namely, the third linear movement cylinder 50 constitutes a third feed stage of the zoom lens barrel 10. The first lens group L1 is moved together with the third linear movement cylinder 50 in the optical axis direction.

Three linear movement guide portions 37a provided on a second lens group support frame 37 which supports the second lens group L2 are slidably fitted in the second linear movement guide grooves 62 of the linear movement guide ring 60. Due to the engagement of the linear movement guide portions 37a in the second linear movement guide grooves 62, the second lens group support frame 37 is guided to linearly move in the optical axis direction. A second roller 38B protrudes in the radially outward direction from each linear movement guide portion 37a of the second lens group support frame 37. The second rollers 38B are slidably fitted in second lens group guide grooves 39B formed on the inner peripheral surface of the second rotary cylinder 30. The second lens group guide grooves 39B are inclined at a predetermined angle with respect to the optical axis O, so that when the second rotary cylinder 30 is rotated, the second rollers 38B are guided by the second lens group guide grooves 39B. Consequently, the rear lens group support frame 37 which is guided to move linearly and the second lens group L2 are moved forward or backward in the optical axis direction within the second linear movement cylinder 33. Note that in FIG. 1, the first rollers 38A and the second rollers 38B are circumferentially overlapped, and hence, only the first rollers 38A are shown.

The zoom lens barrel 10 constructed as above operates as follows. When the zoom motor M is driven in the forward-feed direction, the first rotary cylinder 17 is advanced from the stationary barrel 13 while rotating. As a result, the first linear movement cylinder 20 is moved forward together with the first rotary cylinder 17, while being guided by the stationary barrel 13 to move linearly. Consequently, the second rotary cylinder 30 is moved forward from the first linear movement cylinder 20 while rotating in the same direction as the first rotary cylinder 17. At the same time, the second linear movement guide cylinder 33 is moved linearly in the optical axis direction O together with the second rotary cylinder 30. When the second rotary cylinder 30 is rotated and advanced, the third linear movement cylinder 50 is further moved forward in the optical axis direction together with the first lens group L1, in accordance with the first lens group guide grooves 39A formed on the inner peripheral surface of the second rotary cylinder 30. At the same time, the second lens group L2 which is guided by the second lens group guide grooves 39B is moved in accordance with a predetermined track within the second rotary cylinder 30. Consequently, the first lens group L1 and the second lens group L2 are moved forward in the optical axis direction, while varying the distance therebetween.

When the zoom motor M is rotated in the reverse direction (toward the retracted position), the zoom lens barrel 10 carries out the above-mentioned operations but in the opposite order.

As can be understood from the foregoing, in the zoom lens barrel 10 having three feed-stages, the zooming operation is carried out by the composite operations of the variation of the distance of the first and second lens groups L1 and L2 from the film surface and the relative movement of the first and second lens groups L1 and L2 close to or away from one another. Moreover, the focusing operation is carried out by moving the first lens group L1 in a direction parallel with the optical axis O at each focal length which is varied in accordance with the zooming operation.

The significant constituent features of the present invention will be discussed below. As mentioned above, the first rotary cylinder 17 and the first linear movement cylinder 20 are connected so as to relatively rotate about the optical axis O but not to relatively move in the optical axis direction. The connection structure is as follows.

The first linear movement cylinder 20 is provided on its rear end with a rear end rib 40 whose diameter is larger than that of the body portion of the first linear movement cylinder 20. Also, the first linear movement cylinder 20 is provided on its outer peripheral surface with two rear engagement pawls 41 (41A, 41B) that are located in front of and close to the rear end rib 40, and two front engagement pawls 42 (42A, 42B) that circumferentially correspond to the rear engagement pawls 41. As can be seen in FIGS. 4 and 5, the corresponding front and rear engagement pawls 42A and 41A are spaced in the optical axis direction and are located on opposite sides of the through-groove 25 and the corresponding front and rear engagement pawls 42B and 41B are spaced in the optical axis direction and are located on opposite sides of the through-groove 25. The engagement pawls 41 and 42 are identical in the length in the circumferential direction. The circumferential length of the engagement pawls 41 and 42 is larger than the circumferential width of the linear cam grooves 16 formed on the inner surface of the first rotary cylinder 17.

The first rotary cylinder 17 is provided on its inner peripheral surface with a rear annular groove (circumferential groove) 44 at the rear end thereof and a front annular groove (circumferential groove) 45 in front of the rear annular groove 44. The rear annular groove 44 and the front annular groove 45 have bottoms, are formed in parallel planes perpendicular to the optical axis O. The front and rear annular grooves 45 and 44 are located on opposite sides of the center of the first rotary cylinder 17 in the length in the optical axis direction. The axial distance between the front and rear annular grooves 45 and 44 corresponds to the axial distance between the front and rear engagement pawls 42 and 41 of the first linear movement cylinder 20. Hence, the front and rear engagement pawls 42 and 41, and the front and rear annular grooves 45 and 44 constitute the connection structure for the first rotary cylinder 17 and the first linear movement cylinder 20.

The width of the rear engagement pawls 41 in the optical axis direction is such that the rear engagement pawls cannot be moved in the optical axis direction is slidable in the circumferential direction relative to the rear annular groove 44. Likewise, the width of the front engagement pawls 42 in the optical axis direction is such that the front engagement pawls cannot be moved in the optical axis direction is slidable in the circumferential direction relative to the front annular groove 45.

The first rotary cylinder 17 is provided on its inner peripheral surface with two pawl engagement/disengagement grooves 47A and 47B which have bottoms and extend from the rear end of the first rotary cylinder 17 at the rear annular groove 44 through to the front annular groove 45 in the optical axis direction. The rear ends of the pawl engagement/disengagement grooves 47A and 47B open into the rear end face of the first rotary cylinder 17.

The position of the pawl engagement/disengagement groove 47A in the circumferential direction corresponds to the rear engagement pawl 41A and the front engagement pawl 42A, and the position of the pawl engagement/disengagement groove 47B in the circumferential direction corresponds to the rear engagement pawl 41B and the front engagement pawl 42B. The width of the pawl engagement/disengagement grooves 47A and 47B in the circumferential direction is slightly greater than the length of the engagement pawls 41A, 41B, 42A and 42B, in the circumferential direction, so that the engagement pawls can be moved in the optical axis direction within the pawl engagement/disengagement grooves 47A and 47B.

Upon assembling the first rotary cylinder 17 and the first linear movement cylinder 20, the angular positions thereof are registered and the first linear movement cylinder 20 is inserted in the direction S in FIG. 4, into the rear end of the first rotary cylinder 17, so that the front engagement pawls 42A and 42B correspond to the pawl engagement/disengagement grooves 47A and 47B, respectively. Consequently, the front engagement pawls 42A and 42B are moved in the pawl engagement/disengagement grooves 47A and 47B, respectively. Further insertion causes the rear engagement pawls 41A and 41B to enter the pawl engagement/disengagement grooves 47A and 47B, respectively. Since the rear end rib 40 is provided at the rear end of the first linear movement cylinder 20 behind the rear engagement pawls 41A and 41B, the rear end rib 40 abuts against the rear end face of the first rotary cylinder 17 immediately after the rear engagement pawls 41A and 41B enter the pawl engagement/disengagement grooves 47A and 47B. Thus, no further insertion is permitted.

In this position, the pair of rear engagement pawls 41 (41A, 41B) correspond to the rear annular groove 44 and the pair of front engagement pawls 42 (42A, 42B) correspond to the front annular groove 45, so that the first rotary cylinder 17 and the first linear movement cylinder 20 are relatively rotatable due to the engagement of the front and rear engagement pawls in the corresponding front and rear annular grooves. When a slight relative rotation of the first rotary cylinder 17 and the first linear movement cylinder 20 takes place at a disengageable angular position, the front and rear engagement pawls 42 and 41 are disengaged from the pawl engagement/disengagement grooves 47A and 47B and are moved into the corresponding front and rear annular grooves 45 and 44, respectively. Consequently, in this state, it is impossible to draw the first linear movement cylinder out of the first rotary cylinder 17. Namely, the first rotary cylinder 17 and the first linear movement cylinder 20 are connected to each other so as to relatively rotate about the optical axis O but not to relatively move in the direction of the optical axis O. To disengage the first rotary cylinder 17 and the first linear movement cylinder 20, the above mentioned operations are performed in the opposite order; i.e., the first rotary cylinder 17 and the first linear movement cylinder 20 are rotated to the disengageable angular position in which the engagement pawls 41A and 42A are in the pawl engagement/disengagement groove 47A and the engagement pawls 41B and 42B are in the pawl engagement/disengagement groove 47B, respectively. Thereafter, the first linear movement cylinder 20 is drawn backward.

In the assembling operation mentioned above, it is possible to incorporate the second rotary cylinder 30 in the first linear movement cylinder 20 before the first rotary cylinder 17 and the first linear movement cylinder 20 are assembled. The second rotary cylinder 30 is provided with a pair of cam projections 31, so that when the second rotary cylinder 30 is inserted in the first linear movement cylinder 20, the pair of cam projections 31 extend through the corresponding through-grooves 25, with the front ends protruding outward in radial directions. Thereafter, as mentioned above, the angular positions of the first rotary cylinder 17 and the first linear movement cylinder 20 are registered, so that each front engagement pawl 42A and 42B corresponds to each pawl engagement/disengagement groove 47A and 47B. When the first rotary cylinder 17 and the first linear movement cylinder 20 are registered, the angular position of the second rotary cylinder 30 in the first linear movement cylinder 20 is also registered, so that the position of the pair of cam projections 31 corresponds to the position of the pair of linear cam grooves 16. When the first linear movement cylinder 20 is inserted in the direction S in FIG. 4, the radially and outwardly extending cam projections 31 are inserted in the corresponding linear cam grooves 16 from the rear end of the first rotary cylinder 17.

The rear annular groove 44 and the front annular groove 45 intersect the linear cam grooves 16 which guide the cam projections 31, so that when the engagement pawls 41 and 42 are slid in the annular grooves 44 and 45, the engagement pawls 41 and 42 pass through the intersection of the linear cam grooves 16. However, as mentioned above, since the length of the engagement pawls 41 and 42 in the circumferential direction is larger than the width of the linear cam grooves 16 in the circumferential direction, no disengagement of the engagement pawls 41 and 42 from the annular grooves 44 and 45 in the linear cam grooves 16 occurs during the relative rotation of the first rotary cylinder 17 and the first linear movement cylinder 20.

The relative angular range in which the first rotary cylinder 17 and the first linear movement cylinder 20 are maintained disengageable in the optical axis direction, i.e., the disengageable angular position, can be optionally determined taking into account the displacement necessary to advance or retract the zoom lens barrel. For example, in the zoom lens barrel 10, the pawl engagement/disengagement grooves 47A and 47B are not symmetrically arranged in the circumferential direction, with respect to the optical axis O, and accordingly, the rear engagement pawls 41A and 41B and the front engagement pawls 42A and 42B are not symmetrically arranged in the circumferential direction, respectively. Consequently, at least one of the combinations of the rear engagement pawl 41A and the front engagement pawl 42A, and the rear engagement pawl 41B and the front engagement pawl 42B engages with the rear annular groove and the front annular groove 45, at the angular position other than the disengageable angular position. Therefore, it is theoretically possible to relatively rotate the first rotary cylinder 17 and the first linear movement cylinder 20 without being disengaged over a range of almost 360 degrees. However, the relative angular displacement of the first rotary cylinder 17 and the first linear movement cylinder 20 may be smaller than this angle in practice. From the viewpoint of the firm connection of the lens barrel members, the relative angular displacement is preferably set so as to maintain all the four engagement pawls in engagement with the corresponding annular grooves.

In the illustrated embodiment, although the width of all the engagement pawls and the pawl engagement/ disengagement grooves in the circumferential direction is identical, it is possible to provide the engagement pawls or the pawl engagement/disengagement grooves at different positions in the circumferential direction, having different widths in the circumferential direction or different engagement depths in the radial direction. In this alternative, it is possible to increase the relative angular displacement of the lens barrel when all the engagement pawls are engaged in the corresponding annular grooves.

According to the lens barrel structure as described above, since the first rotary cylinder 17 and the first linear movement cylinder 20 are connected through the engagement between the rear annular groove 44 and the rear engagement pawls 41 (41A, 41B) and the engagement between the front annular groove 45 and the front engagement pawls 42 (42A, 42B), the connection is more firm and reliable than the connection established only at the rear ends thereof. In the prior art, in order to increase the strength of the lens barrel, it is necessary to increase the thickness of the lens barrel or the length of the cam groves or through-grooves in the optical axis direction, or provide a reinforcing rings at the front ends of the rotary feed cylinder and the linear movement cylinder, thus resulting in an increase in the size and the number of the elements of the lens barrel. However, in the present invention, these drawbacks can be eliminated and a firm connection can be obtained. In the lens barrel of the illustrated embodiment, since the through-grooves 25 are formed on the first linear movement cylinder 20 to extend through the outer and inner surfaces thereof, the portion of the lens barrel in front of the through-grooves 25 tends to be deflected or inclined; accordingly, the connection mechanism of the present invention is beneficial for preventing such a tendency.

In the illustrated embodiment, the first rotary cylinder 17 is provided with the circumferential grooves and the first linear movement cylinder 20 is provided with the engaging pawls. This is because the first linear movement cylinder 20 is thinner than the first rotary cylinder 17, and the through-grooves 25 are provided in the first linear movement cylinder 20, and hence the first linear movement cylinder 20 is weaker than the first rotary cylinder 17. However, the present invention is not limited thereto. Alternatively, it is possible to provide the circumferential grooves on the linear movement cylinder and to provide the engagement pawls on the rotary cylinder. Although the two circumferential grooves (and corresponding engagement pawls) at different axial positions in the illustrated embodiment, it is possible to provide three or more circumferential grooves (and corresponding engagement pawls).

Moreover, contrary to the illustrated embodiment, the linear movement lens barrel member can be larger in diameter than the rotary lens barrel member, so that the smaller rotary lens barrel member can be located within the linear movement lens barrel member to achieve the same object of the present invention. In other words, so long as a pair of cylindrical members are connected to each other to be relatively rotatable and not movable in the optical axis direction by a connection mechanism having a plurality of circumferential grooves at different axial positions and engagement pawls engaging with the circumferential grooves, it is possible to increase the strength of the lens barrel by a simple structure without increasing the size thereof.

As can be understood from the above discussion, according to the present invention, a simple and small zoom lens barrel having an increased strength can be provided.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel comprising;
    a rotary feed cylinder which is moved in an optical axis direction while being rotated;
    a linear movement cylinder which is provided within the rotary feed cylinder and which is guided to linearly move in the optical axis direction; and
    a connecting structure for connecting the linear movement cylinder to the rotary feed cylinder so as to relatively rotate and so as not to relatively move in the optical axis direction;
    wherein said connecting structure comprises:
    at least two circumferential grooves centered about the optical axis, which are provided on one of said inner peripheral surface of the rotary feed cylinder and said outer peripheral surface of the linear movement cylinder, at different positions in the optical axis direction; and
    at least two radially extending engagement pawls which are provided on the other of said inner peripheral surface of the rotary feed cylinder and said outer peripheral surface of the linear movement cylinder, at different positions in the optical axis direction and which correspond to the at least two circumferential grooves, said engagement pawls being engaged in the circumferential grooves so as to slide in the circumferential direction and so as not to relatively move in the optical axis direction.

2. The zoom lens barrel according to claim 1, wherein said at least two circumferential grooves are located on opposite sides of said one of said inner peripheral surface of the rotary feed cylinder and said outer peripheral surface of the linear movement cylinder, in the optical axis direction, in which the circumferential grooves are formed.

3. The zoom lens barrel according to claim 1, wherein said at least two engagement pawls are provided on the linear movement cylinder, said linear movement cylinder being provided with a through-groove inclined with respect to the optical axis, said at least two engagement pawls being located on opposite sides of the through-groove in the optical axis direction.

4. The zoom lens barrel according to claim 1, wherein said connecting structure comprises a plurality of coaxial engagement pawls at different circumferential positions, corresponding to said at least two circumferential grooves.

5. The zoom lens barrel according to claim 1, wherein said at least two circumferential grooves are formed on the inner peripheral surface of the rotary feed cylinder, said at least two engagement pawls being formed on the outer peripheral surface of the linear movement cylinder, said rotary feed cylinder being provided on the inner peripheral surface thereof with a pawl engagement/disengagement groove which extends from the rear end thereof to the frontmost circumferential groove, of said at least two circumferential grooves, in parallel with the optical axis, so that said engagement pawls can be disengageably engaged with the at least two circumferential grooves in the optical axis direction at a specific relative angular position between the rotary feed cylinder and the linear movement cylinder.

6. The zoom lens barrel according to claim 5, wherein the inner peripheral surface of the rotary feed cylinder on which the circumferential grooves are formed, is provided with an axial groove different from the pawl engagement/disengagement groove, said axial groove extending in parallel with the optical axis and intersecting the circumferential grooves, wherein the length of the engagement pawls in the circumferential direction are larger than the width of said axial groove.

7. A zoom lens barrel having a pair of cylindrical members of different diameters which are connected so as to relatively rotate and so as not to relatively move in an optical axis direction, wherein a connecting structure for connecting said pair of cylindrical members comprises:

at least two circumferential grooves centered about the optical axis, which are provided on one of an inner peripheral surface of a larger diameter cylindrical member of said pair of cylindrical members, and an outer peripheral surface of a smaller diameter cylindrical member of said pair of cylindrical members, at different positions in the optical axis direction; and at least two radially extending engagement pawls which are provided on the other of said inner peripheral surface of said larger diameter cylindrical member and said outer peripheral surface of said smaller diameter cylindrical member, at different positions in the optical axis direction, and which correspond to said at least two circumferential grooves, said engagement pawls being engaged in the circumferential grooves so as to slide in the circumferential direction and so as not to relatively move in the optical axis direction.

8. A connecting structure of a pair of cylindrical members used for a zoom lens barrel, said pair of cylindrical members having different diameters, said connecting structure comprising:

at least two circumferential grooves centered about the optical axis, which are provided on one of an inner peripheral surface of a larger diameter cylindrical member of said pair of cylindrical members, and an outer peripheral surface of a smaller diameter cylindrical member of said pair of cylindrical members, at different positions in the optical axis direction; and at least two radially extending engagement pawls which are provided on the other of said inner peripheral surface of the larger diameter cylindrical member and said outer peripheral surface of the smaller diameter cylindrical member, at different positions in the optical axis direction and which correspond to said at least two circumferential grooves, said engagement pawls being engaged in the circumferential grooves so as to slide in the circumferential direction and so as not to relatively move in the optical axis direction.

9. The connecting structure according to claim 8, wherein said at least two circumferential grooves are located on opposite sides of one of said larger diameter cylindrical member and said smaller diameter cylindrical member, in the optical axis direction, in which the circumferential grooves are formed.

10. The connecting structure according to claim 8, wherein said at least two engagement pawls are provided on the smaller diameter cylindrical member, said smaller diameter cylindrical member being provided with a through-groove inclined with respect to the optical axis, said at least two engagement pawls being located on opposite sides of the through-groove in the optical axis direction.

11. The connecting structure according to claim 8, wherein said connecting structure comprises a plurality of coaxial engagement pawls at different circumferential positions, corresponding to said at least two circumferential grooves.

12. The connecting structure according to claim 8, wherein said at least two circumferential grooves are formed on the inner peripheral surface of the larger diameter cylindrical member, said at least two engagement pawls being formed on the outer peripheral surface of the smaller diameter cylindrical member, said larger diameter cylindrical member being provided on the inner peripheral surface thereof with a pawl engagement/disengagement groove which extends from the rear end thereof to the frontmost circumferential groove, of said at least two circumferential groove, in parallel with the optical axis, so that said engagement pawls can be disengageably engaged with said at least two circumferential grooves in the optical axis direction at a specific relative angular position between the larger diameter cylindrical member and the smaller diameter cylindrical member.

13. The connecting structure according to claim 12, wherein said inner peripheral surface of the larger diameter cylindrical member on which the circumferential grooves are formed, is provided with an axial groove different from the pawl engagement/disengagement groove, said axial groove extending in parallel with the optical axis and intersecting the circumferential grooves, the length of the engagement pawls in the circumferential direction being larger than the width of the axial groove.

* * * * *